United States Patent [19]

Worsham

[11] 4,313,613
[45] Feb. 2, 1982

[54] STEERING STABILIZER STRUCTURE FOR THE FRONT WHEELS OF A VEHICLE

[76] Inventor: Doyle H. Worsham, P.O. Box 231, Boaz, Ala. 35957

[21] Appl. No.: 102,103

[22] Filed: Dec. 7, 1979

[51] Int. Cl.³ .............................................. B62D 7/08
[52] U.S. Cl. .................................... 280/94; 280/95 A
[58] Field of Search ..................... 280/94, 95 R, 95 A; 267/150

[56] References Cited

U.S. PATENT DOCUMENTS

| | | | |
|---|---|---|---|
| 2,993,704 | 7/1961 | Worsham | 280/94 X |
| 3,393,919 | 7/1968 | Ragsdale | 280/94 |
| 3,448,991 | 6/1969 | Leggett | 280/94 |
| 3,721,455 | 3/1973 | Blanton | 280/94 |
| 3,848,885 | 11/1974 | Hefren | 280/94 |
| 3,961,804 | 6/1976 | Blanton | 280/94 |
| 3,980,315 | 9/1976 | Hefren | 280/94 |

*Primary Examiner*—Robert R. Song
*Attorney, Agent, or Firm*—Berman, Aisenberg & Platt

[57] ABSTRACT

A stabilizer apparatus which can be connected to the steering mechanism of a vehicle such that movement of the vehicle wheels from a neutral position is resisted by a spring assembly. The apparatus is characterized by a camber plate affixed to the steering arm at the underside of the steering knuckle sleeve and having a fulcrum recess abutting the wheel kingpin. A recovery bar of the same size as the camber plate is held generally parallel thereto by a pair of cables connecting their ends. The recovery bar has a fulcrum pin aligned with the camber plate fulcrum recess and underlying the vehicle axle. The spring assembly has a first coil spring connected in compression between a mounting member and the fulcrum pin and aligned with the king pin and fulcrum pin to urge the recovery bar rectilinearly away from the wheel in a direction parallel to the vehicle axle, and a pair of second coil springs connected in tension between the mounting member and the recovery bar and arranged at equal distances on each side of the first coil spring to urge the recovery bar away from the wheel. Turning movements of the vehicle wheel will move the recovery bar axially toward the wheel, and will be resisted by both the first coil spring and one of the pair of second coil springs.

11 Claims, 8 Drawing Figures

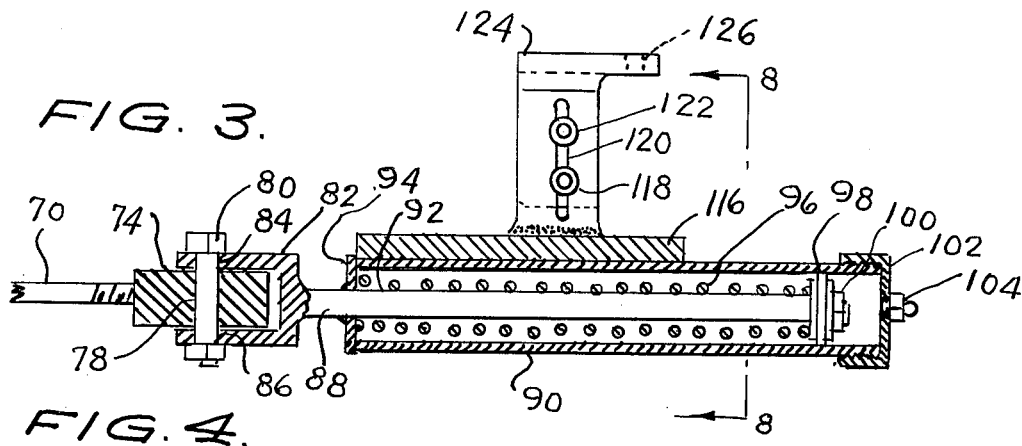
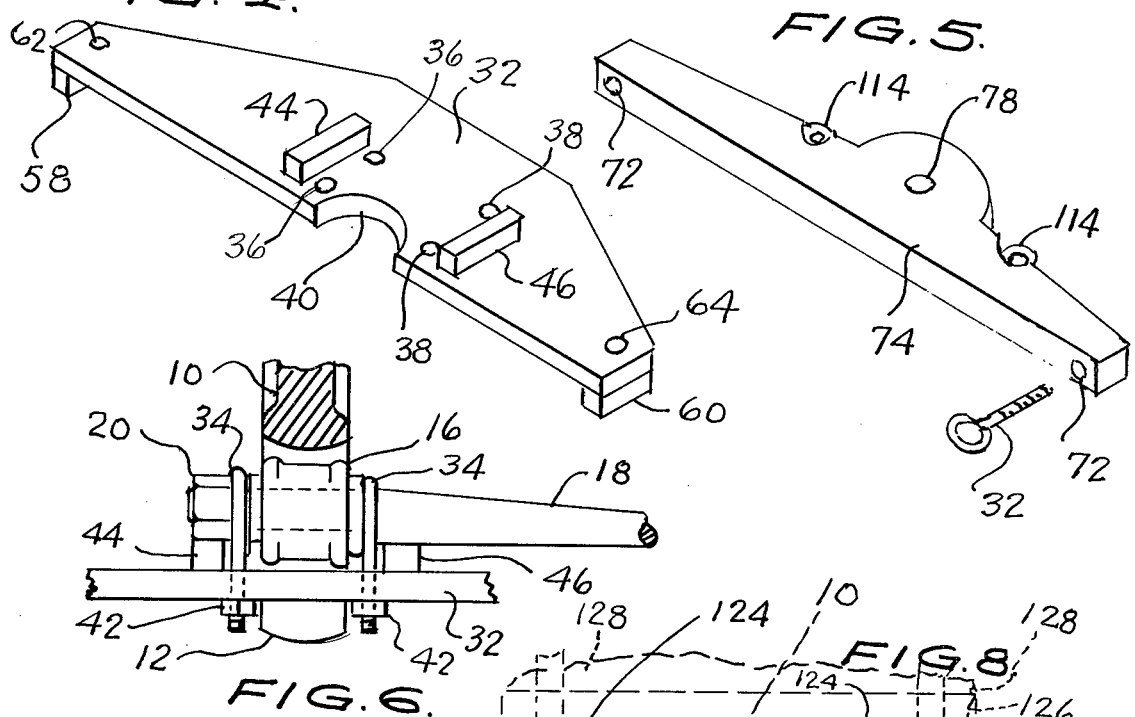
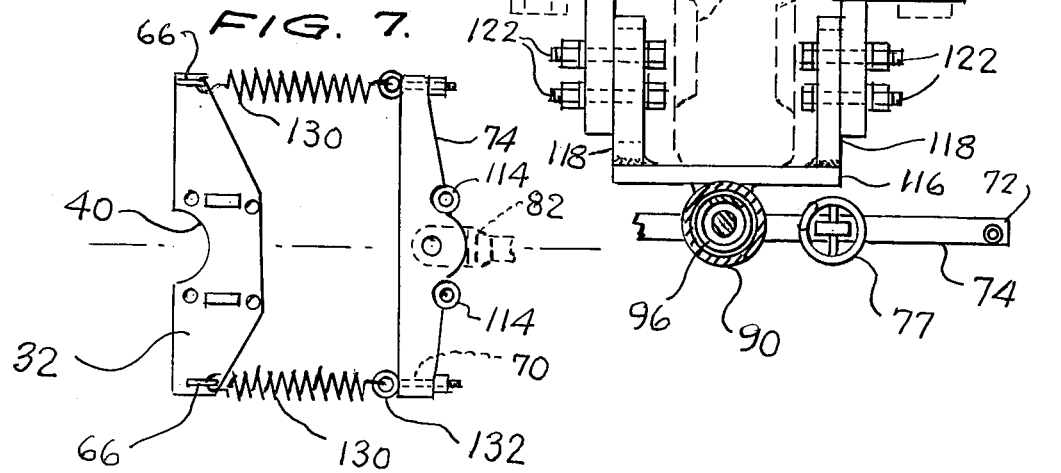

STEERING STABILIZER STRUCTURE FOR THE FRONT WHEELS OF A VEHICLE

FIELD OF THE INVENTION

This invention relates to stabilizer apparatus for steering systems of vehicles, and more particularly to a stabilizer structure suitable for use with heavy duty vehicles such as trucks and tractor trailers.

BACKGROUND OF THE INVENTION

Motor vehicles conventionally have their steerable wheels arranged in pairs, pivotally mounted at the opposite ends of a cross member, or axle, and steerable in unison through a suitable linkage. The paired steerable wheels are prone to misalignment, by upsetting of their adjustments through road shocks and wear in various parts, and such misalignment results in considerable expense to repair and to avoid excessive tire wear. Sudden and unexpected steering wheel misalignments occur when a tire blows out or a wheel strikes a curb or other comparable obstacles, and frequently cause loss of control and severe damage and injury to the vehicle and its occupants.

A solution to the problems posed by misalignments of both types mentioned is disclosed in the Worsham U.S. Pat. No. 2,993,704 issued July 25, 1961. Various different solutions are set forth in othe prior art patents, as for example:

Hefren U.S. Pat. No. 3,980,315; Ragsdale U.S. Pat. No. 3,393,919; Legget U.S. Pat. No. 3,448,991; and Blanton U.S. Pat. No. 3,961,804.

It is to these same problems that the present invention is directed.

SUMMARY OF THE INVENTION

The primary object of the present invention is to provide an improved steering control for stabilizing a steering wheel of a heavy duty vehicle such as a truck, or tractor trailer.

Another important object of the present invention is to provide an improved steering stabilizer structure which employs a minimum number of springs to resist turning of the wheel and to return the wheel to its neutral position, the springs being assembled in a configuration involving a minimum of space so as to yield an inexpensive and practical stabilizer structure even for heavy duty vehicles.

A further important object of the invention is to provide an improved steering stabilizer structure, having the above described characteristics, which will fit and can be easily installed on all types and sizes of heavy duty vehicles and without the necessity to provide different parts or parts of different size in the stabilizer to enable its installation and subsequent practical operation.

To meet the above objects, the improved stabilizer embodies a horizontal camber plate affixed to the steering arm at the underside of the steering knuckle and having a fulcrum recess abutting the wheel kingpin. A recovery bar of the same size as the camber plate is held parallel to the plate by a pair of cables connecting their ends. The recovery bar has a fulcrum pin aligned with the fulcrum recess of the camber plate and lying in a vertical fulcrum plane bisecting the vehicle axle. The small spring assembly includes a compression spring lying in said fulcrum plane and connecting the fulcrum pin of the recovery bar to a mounting member affixed to the underside of the axle, and a pair of expansion springs connecting the mounting member and the recovery bar and disposed at equal distances on each side of the fulcrum plane. Thus turning movements of the vehicle wheel will move the recovery bar toward the wheel as it turns to be resisted by said first compression spring as well as by one of the pair of expansion springs.

The above stated and various other objects and advantages of the invention will become readily apparent to those skilled in the art upon reading the following detailed description and claims and by referring to the accompanying drawings forming a part hereof, wherein like numerals refer to like parts throughout.

BRIEF DESCRIPTION OF THE DRAWINGS

FIG. 3 is a fragmentary enlarged sectional view taken on line 3—3 of FIG. 2 and looking in the direction of the arrows, but showing stabilizer parts only;

FIG. 4 is a perspective view of the camber board forming part of the stabilizer apparatus;

FIG. 5 is a perspective view of the recovery bar forming part of the stabilizer apparatus;

FIG. 6 is a fragmentary enlarged sectional view taken on line 6—6 of FIG. 1 and looking in the direction of the arrows;

FIG. 7 is a plan view of the stabilizer apparatus omitting certain parts, similar to FIG. 2 but showing a modified structure; and FIG. 8 is a sectional view taken on line 8—8 of FIG. 3 and looking in the direction of the arrows.

DETAILED DESCRIPTION OF THE PREFERRED EMBODIMENTS

Figure 1:
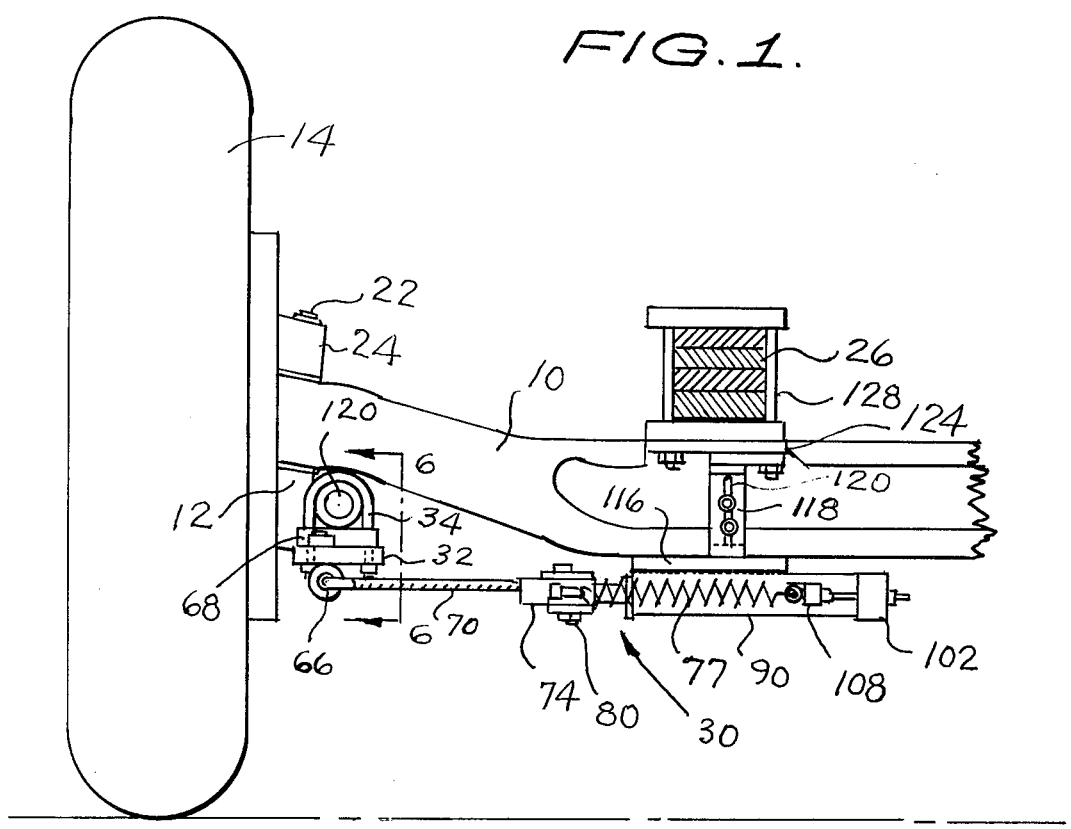
FIG. 1 is a front elevational view of a stabilizer apparatus in accordance with the invention installed on a truck axle to control the right front wheel.

Referring now more specifically to the drawings, the reference numeral 10 designates an I-beam axle from one end of which a steering knuckle 12 is oscillatably supported. The knuckle is rigidly affixed to a front truck wheel 14 and includes a projecting sleeve portion 16, FIG. 6 open at its opposite ends and through which one end of a steering arm 18 is secured by means of a castellated nut 20. The wheel knuckle rotates about king pin 22; supported at a slight incline to the vertical in an axle collar 24 and passing through the knuckle. The axle is transversely supported from longitudinal leaf springs 26 in a conventional manner.

The structure thus far described above is conventional for vehicles and particularly for heavy duty trucks and tractor-trailers. The novel stabilizer structure unit constituting the present invention is generally designated 30 in FIGS. 1 and 2 and comprises the parts to be described.

To anchor the springs of the novel stabilizer arrangement a horizontal camber board 32 is used which is elongated longitudinally of the vehicle and affixed to steering arm 18 by a pair of U-bolts 34, 34 as best seen in FIG. 6. The legs of the U-bolts pass through two pairs of openings 36, 38, in FIG. 4, which are spaced so that the U-bolts clamp the steering arm immediately adjacent the ends of the collar 24, and adjacent or on the castellated nut 20. A circular recess 40 in the outer edge of the camber board or plate 32, herein called a fulcrum recess, receives the knuckle and kingpin structure, so that when the camber plate 32 is clamped tightly by nuts 42 applied to the bottoms of bolts 34, the plate will turn with the wheel about the kingpin. Preferably fulcrum recess 40 is slightly offset, about one inch, from the center of the outer edge of the camber plate so that the longer end extends forwardly of the vehicle in the direction of the arrow A, in FIG. 2. This allows the stabilizer to be mounted on any truck, with or without front wheel brakes, and permits space for proper operation of the unit springs and cables.

Camber plate 32 is further provided with a pair of abutment blocks 44, 46 which are welded or otherwise firmly secured to the plate and function to support or cradle the adjacent portions of the steering arm 18 and castellated nut 20. Another pair of blocks 58, 60 are similarly secured to the opposite surface at the end portions of the camber plate for strengthening thereof, and bores 62, 64 are formed through the plate and blocks for upward passage of eyebolts 66, 66 secured by nuts 68 on the upper surface of the plate.

A pair of wire cables 70, 70 are looped through the eyes 66, 66 and the loops clamped and crimped to securely fasten the cables to the ends of camber plate 32. The other ends of the cables are passed through apertures 72, 72 in the ends of a recovery bar 74 which has the same length as camber plate 32. The free ends of cables 70 receive cable stops 76 which are crimped to securely prevent the cable from sliding out of apertures 72 when the recovery bar is pulled under the force of a pair of tension springs 77, 77, FIG. 2.

Figure 2:
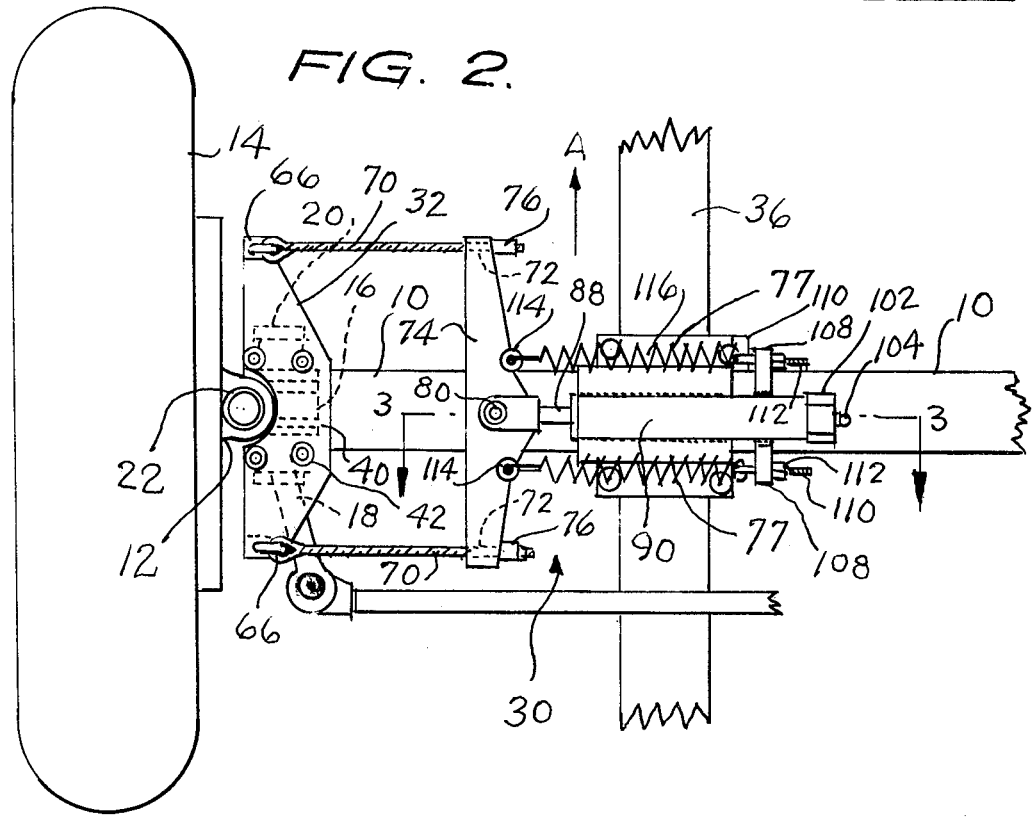
FIG. 2 is a bottom plan view of the stabilizer apparatus shown in FIG. 1.

The recovery bar has an off center opening 78 passing vertically through the bar and receiving a fulcrum pin or bolt 80, which is in line with the center of fulcrum recess 40 in the camber plate and the kingpin 22, and which underlies the center line of axle 10. A yoke 82 is pivotally secured to fulcrum pin 80, which passes through vertically aligned apertures 84, 86 in the yoke. The yoke is integrally connected to a rod 88 which slideably moves in tube 90 through an aperture 92 in the disc cover 94 at one end, FIG. 3. The rod 88 is surrounded by a coil spring 96 which is housed in the tube between the cover 94 and the washer 98. The washer adjustably holds the spring in compression by a nut 100 threaded on the inner end of rod 88. The inner end of the tube 90 is closed by a threaded cap 102 in which a grease fitting 104 enables feeding of grease into tube 90 to lubricate and protect spring 96. A pair of lugs 108, 108, FIG. 2, are welded to the tube 90 to project forwardly and rearwardly of the vehicle. Eye bolts 110 pass through apertures in the lugs and receive the hook ends of expansion springs 77 for adjustably tensioning these springs by turning nuts 112. The other ends of the springs 77 are hooked into a pair of eyes 114 which are permanently affixed to the recovery bar 74 at equal distances forward and rearwardly of the fulcrum pin aperture 78, or pin 80.

For fixedly positioning the springs 77 and 96 and the related parts of the stabilizer structure with respect to the vehicle and the steerable wheel, the tube 90, housing spring 96, is welded centrally to the underside of a rectangular mounting plate 116. This mounting plate is supported under axle 10, with the compression spring 96 and its housing directed axially under the center of the axle to align with the fulcrum pin 80 and kingpin 22, by a pair of upstanding plates 118, welded to the forward and rear edges of mounting plate 116. A vertical central slot 120 is formed in each plate 118 for receiving locking bolts 122. The locking bolts 122 are received in spaced openings in the vertical legs of a pair of inverted L-shaped mounting brackets 124 whose horizontal legs have an aperture 126 for reception of U-bolts 128 which secure the leaf springs 26 to the axle 10. The described mounting bracket structure mades it easy to suspend the mounting plate 116 directly under the axle at an adjustable height and with the pair of plates 118 embracing the front and rear sides of the axle.

Stabilizer apparatus similar to that described above but a mirror image of the same is installed also on the left front steerable wheel of the vehicle. The two stabilizers operate to limit the wheels from unintentionally deviating from their normal course and to quickly return the wheels to their normal straight line course without detriment to normal steering of the vehicle.

In operation of the installed stabilizer unit, the spring 96 in tube 90 having been adjusted in compression to exert a suitable force on fulcrum pin 80 in a direction away from wheel 14, FIG. 2, and expansion springs 77, 77 having been tensioned to pull the eyelets 114 in the same direction, recovery bar 74 will be roughly parallel to camber plate 32 and the pair of cables 70, 70 will be stretched to their maximum lengths. Now, should an obstruction in the road, or other means, cause the wheel to turn clockwise as viewed in FIG. 2, the camber plate 32 will turn with the wheel pulling the lower cable 70 leftward and partially collapsing the upper cable 70. This causes the fulcrum pin 80 and the center of the recovery bar to move toward the wheel against the resistance of spring 96 further compressing this spring. The recovery bar will also turn clockwise about the moving fulcrum pin 80 causing the lower expansion spring 77 to expand further which offers resistance to the turning of the wheel, while the upper expansion spring 77 is somewhat compressed. Thus, both the spring 96 and the lower spring 77 resist turning of the wheel and quickly cause the recovery bar pin 80 to move back away from the wheel and the lower part of the recovery bar to turn counter-clockwise, returning the wheel to its normal straight course. When the wheel is unintentionally turned in the opposite direction, i.e., counter-clockwise as viewed in FIG. 2, the fulcrum pin 80 and center of the recovery bar are again pulled toward the wheel against the force of spring 96, but the recovery bar 74 is turned counter-clockwise about fulcrum pin 80 expanding upper spring 77 and contracting lower spring 77. Thus, both the spring 96 and the upper spring 77 exert force to quickly return the recovery bar and wheel directions their normals, as shown in FIG. 2. Since two springs operate simultaneously to return the wheel, they are normally sufficient to function quickly even with large wheels on heavy duty vehicles. Further, since spring 96 is disposed in the plane of the vehicle axle, the kingpin and the fulcrum pin of bar 74 and directs its force in this plane, a minimum of space is required for the spring assembly. Furthermore at least one spring is eliminated as compared to a conventional assembly in which two or more springs exercise return force simultaneously because they also exercise leverage on the recovery bar or camber plate and must be positioned at a distance from the fulcrum plane.

In the embodiment of FIG. 7, intended for installation on very large and very heavy duty trucks, all parts of the stabilizer structure are identical with those of the FIG. 2 embodiment described above, except that cables 70, 70 are respectively replaced by a pair of expansion springs 130, 130 stretched between eye bolts 66 and eye bolts 132 fastened in openings 72 at the ends of the recovery bar 74. The stabilizer partly shown in FIG. 7 operates in the same manner as the FIG. 2 structure as described above except that accidental turning of the wheel and attached camber plate 32 are opposed by one or the other of the springs 130, whichever is being stretched and lengthened by the direction of turn, as well as by the force of spring 96 and one of springs 77. Similarly the force of stretched spring 130 is added to the force of both spring 96 and one of springs 77 to return the wheel to its straight line normal bearing.

Extensive investigation and testing has revealed that a single size camber plate is suitable for use and fits all trucks and all truck axles such as FF931, FF900, FE901, FE921 and in the 9000–16000, 18000, 20000 pound ratings. It has been found that with the Rockwell axle FE-970 center point steering the camber plate will fit by simply transferring the right side camber plate to the left, and the left to the right side, making sure that the long side is toward the front of the truck. It has also been found that the camber plate will fit White axles in categories F3W-1200, F3W-125, F6W-1200, F3W-1400 by adding a V-notch in bar 44 to support and fit the castellated nut 20, which is turned somewhat. GMC F-120 axles have also been fitted by the camber plate.

The foregoing is considered as being illustrative only of the principle of the invention. Since numerous modifications and changes will readily occur to those skilled in the art, it is not intended to limit the invention to the exact construction and operation shown and described, and accordingly all suitable modifications and equivalents may be resorted to, falling within the scope of the invention.

What is claimed is:

1. Steering stabilizer structure for the steering wheels of a heavy duty vehicle designed to be affixed beneath each extremity of the axle thereof and attached to the wheel steering arms at the steering knuckles, said structure including a wheel camber plate adapted to be located adjacent the underside of the steering knuckle sleeve and disposed longitudinally of said vehicle, means for securing said camber plate to the steering arm, a recovery bar spaced inwardly of said camber plate and at least a pair of spaced apart flexible connection means extending between said bar and plate, said camber plate having a fulcrum recess for the wheel kingpin, said recovery bar having a fulcrum pin aligned with said fulcrum recess and adapted to underlie the vehicle axle, a mounting member having means for fixed attachment to the underside of the vehicle axle, first spring means connected between said mounting member and said fulcrum pin and adapted to be aligned with said kingpin and fulcrum pin and urging said recovery bar away from the wheel in a direction underlying and parallel to the vehicle axle, and at least a pair of second spring means connected one on each side of said first spring means between said mounting member and recovery bar urging the recovery bar away from said camber plate, whereby turning movement of the vehicle wheel will move the recovery bar away from the mounting member and toward the wheel and will be resisted by said first spring means and said second spring means.

2. Steering stabilizer structure as set forth in claim 1, wherein said first spring means is a coil spring connected in compression and said second spring means are coil springs connected in tension.

3. Steering stabilizer structure as set forth in claim 2, wherein said mounting member comprises a plate member at the underside of the vehicle axle having adjustable bracket means for fixed attachment thereto, a tube secured to the plate member parallel to the vehicle axle, the outer end of said tube being closed by a disc having an aperture, said first spring means being disposed in the tube surrounding a rod which passes out of the tube through said aperture and is pivotally connected to said fulcrum pin of the recovery bar.

4. Steering stabilizer structure as set forth in claim 3, wherein the inner end of said rod is threaded and receives a washer-like spring stop and a nut for adjusting the compression of said first spring means.

5. Steering stabilizer structure as set forth in claim 4, wherein the inner end of said tube is closed by a threaded cap having a grease fitting for injecting grease into the cap and tube.

6. Steering stabilizer structure as set forth in claim 5, wherein a pair of forwardly and rearwardly projecting lugs are affixed to said tube intermediate its ends, each of said lugs having a transverse aperture with an eyebolt held therein, said recovery bar having a pair of eyelets equally spaced forwardly and rearwardly of said fulcrum pin, said pair of coil springs forming said second spring means being hooked into said pair of eyelets and eyebolts and being stretched to an adjusted tension maintained by a pair of nuts threaded on the eyebolts.

7. Steering stabilizer structure according to claim 6, wherein said means for securing said camber plate to the steering arm comprises a pair of U-bolts for embracing the steering arm on each end of the steering knuckle sleeve and passing through two pairs of spaced openings in the camber plate for reception of securing nuts at the underside of the camber plate.

8. Steering stabilizer structure according to claim 7, wherein said connection means between said camber plate and recovery bar comprises a pair of cables, one secured between the forward ends of the plate and bar and the other between the rearward ends.

9. Steering stabilizer structure according to claim 7, wherein said connection means between said camber plate and recovery bar comprises a pair of coil springs adjustably secured in tension one between the forward ends of the plate and bar and the other between the rearward ends.

10. Steering stabilizer structure according to claim 7 wherein said fulcrum recess of the camber plate and fulcrum pin of the recovery bar are each offset slightly rearwardly of the centers of said plate and bar by the same amount.

11. Steering stabilizer structure according to claim 1, wherein second spring means comprises a pair of spring means arranged at equal distances on each side of said fulcrum pin.

* * * * *